US011318897B2

(12) United States Patent
Gibeau et al.

(10) Patent No.: US 11,318,897 B2
(45) Date of Patent: May 3, 2022

(54) HYBRID VEHICLE ELECTRICAL DISTRIBUTION SYSTEM HAVING INTEGRATED FUSE CONDUCTOR PATHS

(71) Applicant: Ford Global Technologies, LLC, Dearborn, MI (US)

(72) Inventors: John Paul Gibeau, Canton, MI (US); Benjamin A. Tabatowski-Bush, Ann Arbor, MI (US); Baojin Wang, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 16/741,118

(22) Filed: Jan. 13, 2020

(65) Prior Publication Data
US 2021/0213894 A1    Jul. 15, 2021

(51) Int. Cl.
*B60L 50/61* (2019.01)
*B60R 16/023* (2006.01)
*B60R 16/033* (2006.01)
*H01H 85/08* (2006.01)

(52) U.S. Cl.
CPC .......... *B60R 16/0238* (2013.01); *B60L 50/61* (2019.02); *B60R 16/033* (2013.01); *H01H 85/08* (2013.01)

(58) Field of Classification Search
CPC .......... B60L 55/00; B60L 58/12; B60L 53/62; B60L 53/34; B60L 53/32; H02H 3/00; H02H 3/30; B60H 1/00; B60H 1/00764; B60H 1/00007; H02J 7/04; H02J 7/06; H02J 7/16; H02J 7/24

USPC ........ 307/10.1, 9.1, 66, 80, 68, 71; 320/118, 320/134, 162, 163, 164
See application file for complete search history.

(56) References Cited

U.S. PATENT DOCUMENTS

| | | | |
|---|---|---|---|
| 6,016,045 A * | 1/2000 | Thomas ................. | H02J 9/061 320/107 |
| 9,504,142 B2 | 11/2016 | Hanazaki | |
| 2002/0142627 A1 | 10/2002 | Kameyama | |
| 2009/0140698 A1 * | 6/2009 | Eberhard .............. | H02J 7/1492 320/152 |
| 2012/0105015 A1 * | 5/2012 | Hermann .............. | H02J 7/0029 320/164 |
| 2017/0113511 A1 * | 4/2017 | Khafagy ........... | B60H 1/00042 |
| 2019/0023256 A1 * | 1/2019 | Khafagy ............... | F02N 11/084 |
| 2019/0131749 A1 | 5/2019 | Utsunomiya et al. | |
| 2019/0249640 A1 * | 8/2019 | Miller .................. | B60W 20/15 |
| 2020/0353839 A1 * | 11/2020 | Tarchinski ............. | B60L 55/00 |
| 2020/0395765 A1 * | 12/2020 | Kristjansson ......... | H02J 7/0026 |

* cited by examiner

*Primary Examiner* — Toan T Vu
*Assistant Examiner* — Xuan Ly
(74) *Attorney, Agent, or Firm* — David B Kelley; Brooks Kushman P.C.

(57) ABSTRACT

A vehicle includes an electrified propulsion system powered by a traction battery. The vehicle also includes an electrical distribution system (EDS) to pass current to and from the traction battery. The EDS is provided with at least one flexible electrical distribution component (FEDC) including a plurality of individual conductor paths. At least one of the individual conductor paths defines a typical width and a reduced width narrowed portion sized to operate as a fuse and thereby break an electrical circuit of the at least one individual conductor path in response to heat generated from conducting an electrical current greater than a predetermined threshold.

18 Claims, 3 Drawing Sheets

HYBRID VEHICLE ELECTRICAL DISTRIBUTION SYSTEM HAVING INTEGRATED FUSE CONDUCTOR PATHS

TECHNICAL FIELD

The present disclosure relates to electrified vehicles having an electrical distribution system with integrated fuse conductor paths.

BACKGROUND

Powertrain electrification is used by automakers to improve fuel economy. These systems can have higher electrical ratings and a use a number of high and low voltage components. To minimize the cost of production these components are often sized as small as possible and still cover a majority of the customer use cases. Certain severe use cases might drive current levels and potentially overload one or more electrical components. Overloading may result in over temperature and potentially cause permanent damage to the components. Fuses may be provided at different locations along the electrical distribution system to break the circuit in response to high current conditions thereby protecting one or more components from overcurrent conditions.

SUMMARY

A vehicle includes an electrified propulsion system powered by a traction battery. The vehicle also includes an electrical distribution system (EDS) to pass current to and from the traction battery. The EDS is provided with at least one flexible electrical distribution component (FEDC) connection including a plurality of individual conductor paths. At least one of the individual conductor paths defines a typical width and a reduced width narrowed portion sized to operate as a fuse and thereby break an electrical circuit of the at least one individual conductor path in response to heat generated from conducting an electrical current greater than a predetermined threshold.

An electrical distribution system (EDS) for an electrified vehicle having a high voltage traction battery in electrical communication with a controller includes a flexible electrical distribution component (FEDC) connection including a plurality of individual conductor paths configured to electrically connect the traction battery to the controller. At least one of the individual conductor paths defines a typical width and a reduced width narrowed portion sized to operate as a fuse and thereby break an electrical circuit of the at least one individual conductor path in response to heat generated from conducting electrical current exceeding a predetermined threshold.

A vehicle includes a traction battery including a plurality of battery cells configured to power an electric machine over an electrical distribution system (EDS). The vehicle also includes a controller in electrical connection with the traction battery over the EDS. The vehicle further includes at least one flexible electrical distribution component (FEDC) connection including an individual conductor path extending from each of the plurality of battery cells to the controller. Each of the individual conductor paths defines a typical width and a reduced width narrowed portion sized to operate as a fuse and thereby break an electrical circuit between a corresponding one of the plurality of battery cells and the controller in response heat generated from to conducting an electrical current greater than a predetermined threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Electrified vehicles include high-voltage electrical power source to exchange energy with one or more electrified propulsion sources. In order to protect the electrical components from damage resulting from over current situations, one or more dedicated circuit protection devices may be located at a number of locations with the electrical layout of the vehicle. In some examples electrical fuses are provided, each having a current rating at which the fuse opens to stop current flow therethrough. According to aspects of the present disclosure, circuit protection may be integrated into portions of wiring itself, allowing the wiring to provide circuit protection along with power delivery thus eliminating the need for certain fuses or other circuit protection devices or countermeasures.

Figure 1:
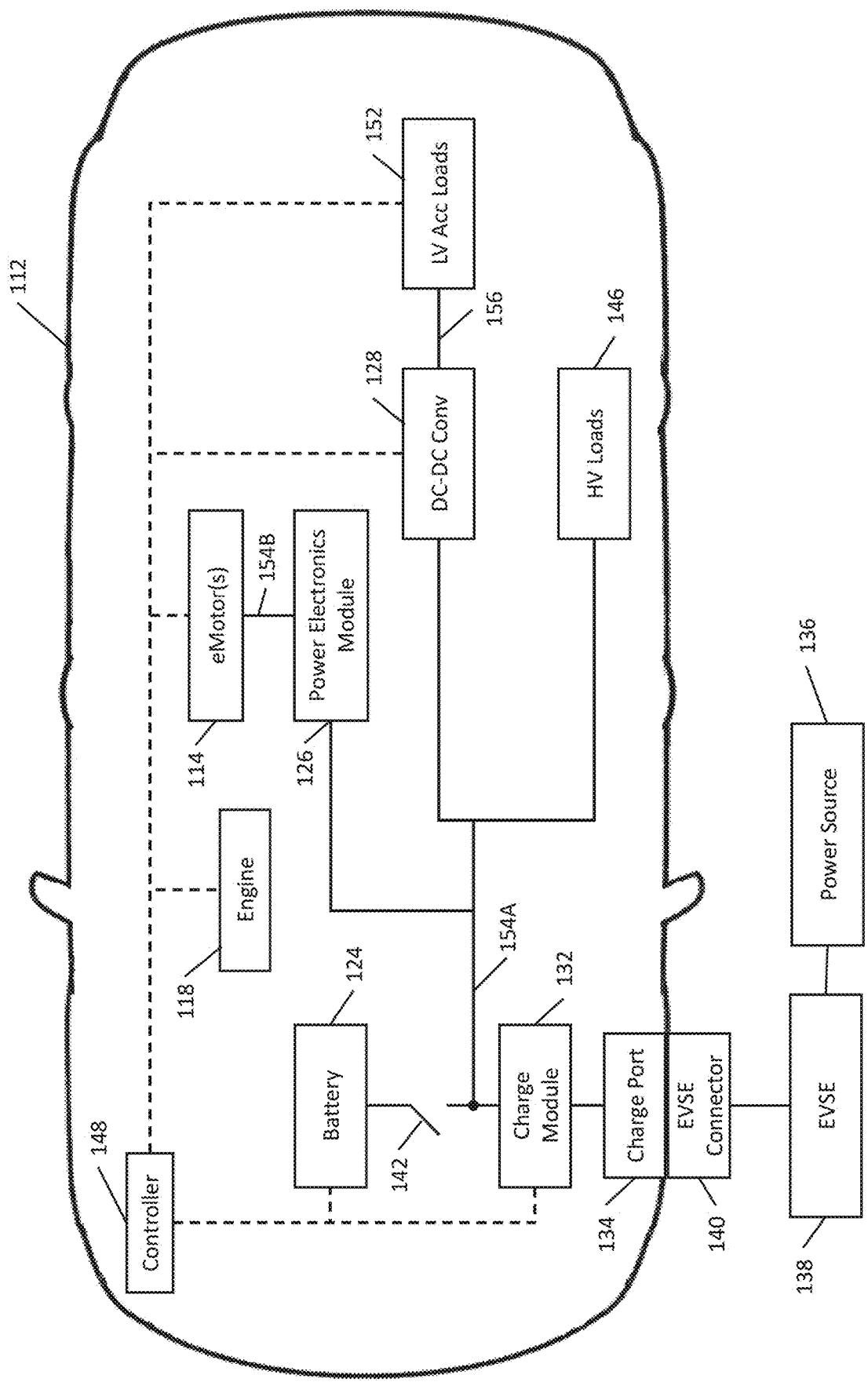
FIG. 1 is a schematic view of a vehicle having electrically-powered components.

FIG. 1 depicts a hybrid-electric vehicle (HEV) 112. The HEV 112 includes an electrified propulsion system having one or more electric machines 114 mechanically coupled to a hybrid transmission (not shown). The electric machines 114 may be capable of operating as a motor or a generator. In addition, the hybrid transmission is mechanically coupled to an internal combustion engine 118 (i.e., ICE). The electric machines 114 are arranged to provide propulsion torque as well as slowing torque capability either while the engine 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery the while the vehicle is operating. The electric machines 114 may further reduce vehicle emissions by allowing the engine 118 to operate near the most efficient speed and torque ranges. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 stores energy that can be used to power the electric machines 114. The battery pack 124 provides a high-voltage direct current (DC) output.

One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., 12V battery). The low-voltage loads 152 may be electrically coupled to the low-voltage bus 156. The low-voltage loads 152 may include various controllers within the vehicle 112.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 includes a charge connector 140 for plugging into a charge port 134 of the vehicle 112. The charge port 134 may be any type of port configured to transfer power from the EVSE 138 to the vehicle 112. The charge port 134 may be electrically coupled to a charge module or on-board power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 112. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

When the vehicle 112 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include components such as compressors and electric heaters. According to a specific example, a vehicle air conditioning system may draw as much as 6 kW under high cooling loads.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

System controller 148, although represented as a single controller, may be implemented as one or more controllers. The controller 148 may monitor operating conditions of the various vehicle components. According to the example of FIG. 1, at least the electric machines 114, engine 118, traction battery 124, DC-DC converter 128, charging module 132, and high-voltage loads 146, and low-voltage loads 152 are in communication with the controller 148. In some specific examples the controller 148 may include algorithms and/or one or more sub-controllers to operate as a battery energy control module (BECM). In other specific examples, the controller 148 may further include algorithms and/or one or more sub-controllers to operate as a battery pack sensing module (BPSM).

In some alternate examples, certain BPSM functions may be integrated with the battery pack itself. In these case, the traction battery 124 may include a current sensor to sense current that flows through the traction battery 124. The traction battery 124 may also include a voltage sensor to sense a voltage across terminals of the traction battery 124. The voltage sensor outputs a signal indicative of the voltage across the terminals of the traction battery 124. The traction battery current sensor outputs a signal indicative of a magnitude and direction of current flowing into or out of the traction battery 124. The traction battery 124 may also include a temperature sensor such as a thermistor that detects temperature based on a change in electrical resistance that is dependent on temperature. In specific examples, the temperature sensor comprises a negative temperature coefficient (NTC) thermistor. The resistance of the NTC thermistor decreases as temperature rises.

The charging module 132 also includes a current sensor to sense current that flows from the EVSE 138 to the traction battery 124. The engine 118 coupled to the electric machine 114 generates an AC current that is converted to a DC current by the power electronics module 126. The engine 118 may be controlled by a powertrain control module having at least one controller in connection with the system controller 148. The current sensor of the charging module 132 outputs a signal indicative of a magnitude and direction of current flowing from the EVSE 138 to the traction battery 124.

The controller is in electrical communication with the traction battery 124. The current sensor, voltage sensor, and temperature sensor outputs of the traction battery 124 and/or BPSM sub-modules are provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the traction battery voltage sensor 104. The specific technique utilized may depend upon the chemical composition and characteristics of the particular battery.

The controller 148 may also be configured to monitor the status of the traction battery 124. The controller 148 includes at least one processor that controls at least some portion of the operation of the controller 148. The processor allows onboard processing of commands and executes any number of predetermined routines. The processor may be coupled to non-persistent storage and persistent storage. In an illustrative configuration, the non-persistent storage is random access memory (RAM) and the persistent storage is flash memory. In general, persistent (non-transitory) storage can include all forms of storage that maintain data when a computer or other device is powered down.

The electrical distribution system (EDS) of vehicle 112 may also include a number of fuses at various locations to protect the electrical hardware components from overcurrent conditions. The fuses are designed to self-destruct and open the circuit in which they are located in the event of a power surge or other over-current situation. With specific reference to the traction battery 124, fuses are commonly applied to cell-sensing leads of battery pack for the purpose of protecting cells from short circuits of sensing leads. Such fuses are historically effective but add cost and complexity through the addition of components. As discussed in detail below, the present disclosure provides components and systems that allow for electrical circuit protection that is integrated into the wiring itself, eliminating the need for certain of the fuses applied in historical systems.

The EDS of vehicle 112 may include various wiring types, including round braided metal wiring, or flexible electrical distribution components (FEDC's) such as, for example, flexible flat cable (FFC), and flexible printed circuits (FPC). In the case of FFC's, wiring portions may consist of a flat and flexible plastic film base, with multiple flat metallic conductors bonded to one surface. Lamination portions may also be included to provide electrical shielding to protect against signal interference, as well as mechanical shielding to inhibit physical damage. The FFC's may be used in place of traditional round cables for easy cable management, especially in tightly packaged applications. FFC's often require less package space than round cables, while offering better EMI/RFI suppression and eliminating wire-coupling issues. In addition, because the wires are protected individually and not wrapped many times over by different materials as round cables are, FEDC's may be lighter in weight and offer greater flexibility.

Each end of the flexible electrical distribution component may be reinforced with a stiffener to make connector insertion easier or to provide strain relief. Also, rigidized portions of the flexible electrical distribution component may include contact portions such that the rigidized portion may replace one or more assembled portions such as a molded connector housing. Additionally, other electrical components such as integrated circuits or other processors may be populated directly on the FEDC. In this way, functions of certain electrical modules and the execution of algorithms may be performed by components directly on the FEDC as opposed to separate electrical modules. Such direct integration of stiffening components or other processing components into the FEDC allow for the elimination of further components and connector-less arrangements.

Figure 2:
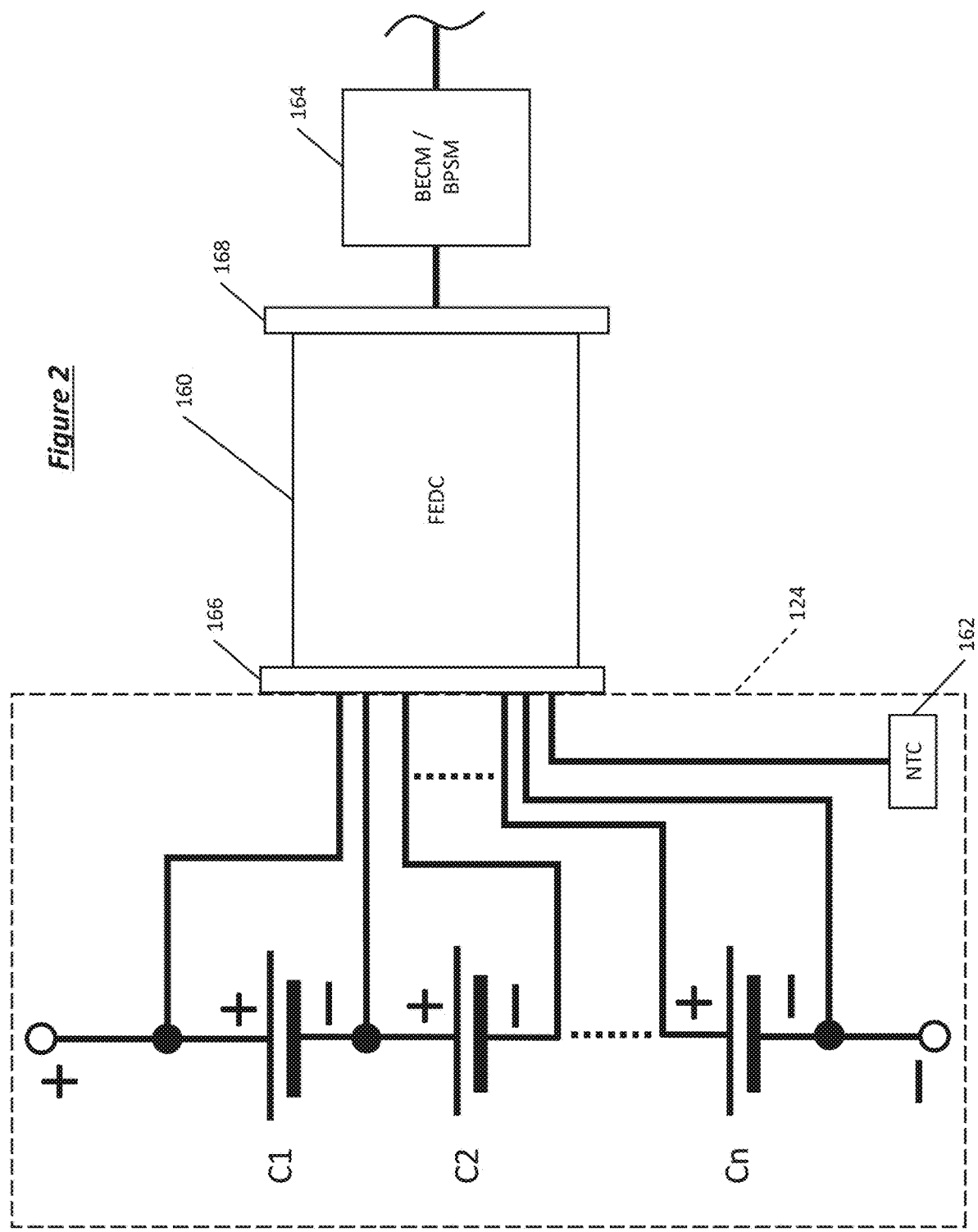
FIG. 2 is a system diagram of a portion of an electrical distribution system (EDS).

Referring to FIG. 2, an FEDC 160 is applied to operate as the connection (or a portion of the connection) to a battery array 124 of the traction battery. As discussed above, the battery array 124 includes a plurality of cells between cell terminals, for example C1 through Cn. In the example of FIG. 2, at least one NTC 162 is integrated within the battery array 124, and a BECM and/or BPSM 164 is external to the battery array 124. Also discussed above, the BECM and/or BPSM 164 may be integrated as part of the controller 148 or may be provided as one or more separate sub-controllers. In further examples, functionality of one or more controllers may be integrated into the FEDC 160 by the application of processors or circuits directly on the FEDC. More specifically, functions of the BPSM such as measuring individual cell voltage and/or temperature may be performed by microprocessors disposed on the FEDC thereby eliminating the need for a separate BPSM component.

The battery cell array comprises a plurality of battery cells C1 through Cn. The FEDC 160 includes a first connector portion 166 to interface with terminals of each of the battery cells C1 though Cn, as well as the NTCs 162. The FEDC also includes a second connector portion 168 to interface with other electrical components of the vehicle 112. As discussed above, certain alternate example FEDC's may eliminate one or more of the connector portions. More specifically, the first connector portion 166 may be eliminated in favor of an FEDC layout that corresponds to a layout of battery terminal connections. Individual traces of the FEDC may be directly soldered to the battery connections. Moreover, while a single NTC is shown by way of example, a plurality of NTCs 162 may be applied to provide temperature sensing associated with each of the individual battery cells C1 through Cn.

The traction battery may also include multiple cell arrays as part of a battery pack assembly. In this case an FEDC may be applied to each cell array to make the desired electrical connections. Alternatively, an FEDC may be arranged to connect to multiple individual cell arrays. Voltage readings corresponding to each cell array may be passed to a controller such as the BPSM such that a collective voltage of an entire battery pack assembly may be calculated.

According to aspects of the present disclosure, individual paths embedded within the FEDC are tailored to provide fusible traces with respect to each connection instead of using discrete parts such as separate fuse components. Integration of fusible traces within the FEDC reduces part cost due to the elimination of fuses, and also reduces manufacturing cost and complexity due to fewer components.

Figure 3:
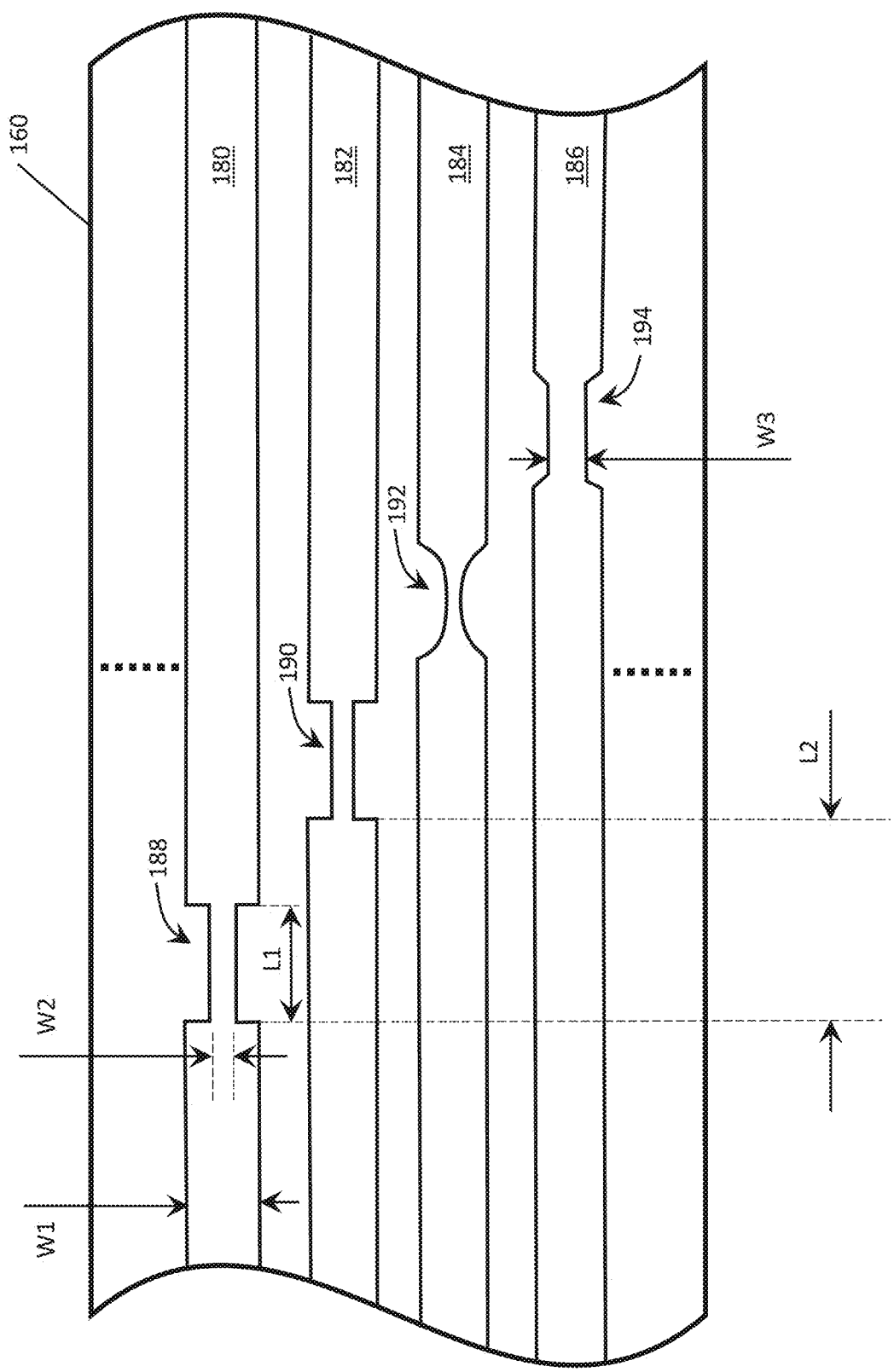
FIG. 3 is a view of a section of a flexible flat cable (FFC) having individual conductor paths with integrated fuses.

Referring to FIG. 3, the FEDC 160 is shown to include individual conductor paths 180, 182, 184, and 186 corresponding to connections to any of the battery cells and/or NTCs within the battery pack. While four individual conductor paths are shown by way of example, any number of individual conductor paths may be provided according to the number of desired connections across the FEDC 160. Each individual conductor path of the FEDC 160 is configured to operate as a fuse. By thinning an individual conductor path to be more narrow than its typical width, the cross sectional area of the conductor path is locally reduced and the local resistance at the thinned portion is increased. Thus, the reduced width narrowed portion of the conductor path operates in similar fashion as a filament portion of a conventional fuse. Sufficiently high current passed through a given conductor path will cause the narrowed portion to melt and break the corresponding electrical circuit of the conductor path thereby protecting the connected component from an over-current condition. According to some examples, each reduced width narrowed portions is sized to operate as a fuse and thereby break the electrical circuit of the corresponding individual conductor path in response to conducting an electrical current greater than a predetermined threshold.

Conductor path 180 is provided with a typical width W1, and the width is reduced at a predetermined location such as reduced width narrowed portion 188 to define a width W2. The widths of both the typical width W1 and the narrowed width W2 may be determined by the desired operating current carrying capacity and the desired maximum allowable fuse current, respectively. The narrowed width W2 may extend along a length L1 to provide for the desired resistance across the narrowed portion 188 Each individual conductor path may carry distinct typical widths as well as narrowed portions having distinct reduced widths along a predetermined length based on the electrical ratings of the component to which the individual conductor path connects. Referring to individual conductor path 186, a larger narrowed portion 194 defines a width W3 corresponding to a greater current carrying capacity relative to narrowed portion of conductor path 180 having width W2. For example, the one or more NTCs 162 may be provided as a low-voltage sensor and carry different fuse requirements relative to the battery cells C1 through Cn and therefore have a different narrowed portion width to operate as a properly rated fuse. In further examples, certain of the plurality of individual conductor paths may maintain the typical width along the entire length of the FEDC and not include any narrowed portion based on the desired electrical properties (i.e., no fuse function within the FEDC for certain desired conductor paths.)

The narrowed portions 188 and 182 of conductor paths 180 and 182, respectively, are depicted as having a rectangular notch shape, however it should be appreciated that alternate shapes may be suitable to meet both the desired electrical fuse properties as well as the mechanical strength requirements of the FEDC 160. Referring to the example of FIG. 3, a semi-elliptical notch shape is applied to the reduced width narrowed portion 192 of conductor path 184. In a further alternative example, a trapezoidal notch shape is applied to the reduced width narrowed portion 194 of conductor path 186. Although not depicted in the examples of FIG. 3, a sinusoidal notch shape having more gradual transitions may also be suitable. The shapes corresponding to the depicted narrowed portions are provided by way of example, but further alternative shapes may be similarly suitable to provide desired fuse properties within the FEDC 160. According to aspects of the present disclosure, a first conductor path defines a first narrowed portion and a second conductor path defines a second narrowed portion, wherein the first narrowed portion defines a width greater than the second narrowed portion. In further examples, the first narrowed portion may be configured to melt in response to conducting electrical current greater than a first predetermined threshold and the second narrowed portion may be configured to melt in response to conducting electrical current greater than a second predetermined threshold.

The narrowed portions of the conductor paths may be longitudinally located along a length of the FEDC 160 so as not to create an undesired bending axis across the FEDC 160. Said another way, the reduced width narrowed portions may be longitudinally staggered along a length of the FEDC 160 to promote uniform flexibility along the length and also maintain the mechanical strength of FEDC 160. The longitudinal stagger distance L2 between any two narrowed portions may be determined based on the characteristics of the materials selected for the individual conductor paths, lamination materials, intended bending geometry, as well as other mechanical aspects of the FEDC 160. According to aspects of the present disclosure, a first conductor path defines a first narrowed portion and a second conductor path defines a second narrowed portion, wherein the second narrowed portion is longitudinally staggered relative to the first narrowed portion.

Each of the conductor paths may be pre-formed to include corresponding narrowed portions prior to assembly within the FEDC 160. According to some examples, the conductor paths may each undergo a punching operation before assembly to remove material. Following any pre-punching operations, the plurality of conductor paths (including punched and non-punched conductor paths as desired) may be assembled within the FEDC by applying insulation layers to either side of the plurality of individual traces. In some alternate examples, the conductor paths are assembled within the FEDC without any narrowed portions, then the FEDC itself is punched to create the desired narrowed portions. In this post-punching example, additional lamination may be applied to either side of the punched FEDC to provide sealing, electrical insulation, and/or mechanical reinforcement.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electrified propulsion system powered by a traction; and
   an electrical distribution system (EDS) to pass current to and from the traction battery, the EDS having at least one flexible electrical distribution component (FEDC) connection including a plurality of individual conductor paths, wherein at least one of the individual conductor paths defines a typical width and a reduced width narrowed portion configured to operate as a fuse and break an electrical circuit of the at least one individual conductor path in response to heat generated from conducting an electrical current that is greater than a predetermined threshold and wherein the reduced width narrowed portion defines a trapezoidal notch shape.

2. The vehicle of claim 1 wherein a first conductor path defines a first narrowed portion and a second conductor path defines a second narrowed portion, wherein the second narrowed portion is longitudinally staggered relative to the first narrowed portion.

3. The vehicle of claim 1 wherein a first conductor path defines a first narrowed portion and a second conductor path defines a second narrowed portion, wherein the first narrowed portion defines a width greater than the second narrowed portion.

4. The vehicle of claim 1 wherein a first narrowed portion is configured to melt in response to heat generated from conducting electrical current greater than a first predetermined threshold and a second narrowed portion is configured to melt in response to heat generated from conducting electrical current greater than a second predetermined threshold.

5. The vehicle of claim 1 wherein at least one of the individual conductor paths passes a signal from a low voltage sensor disposed at the traction battery.

6. The vehicle of claim 1 wherein at least one of the individual conductor paths does not include a narrowed portion.

7. An electrical distribution system (EDS) for an electrified vehicle having a high voltage traction battery in electrical communication with a controller comprising:
   a flexible electrical distribution component (FEDC) connection including a plurality of individual conductor paths configured to electrically connect the traction battery to the controller, wherein at least one of the individual conductor paths defines a typical width and a reduced width narrowed portion configured to operate as a fuse and break an electrical circuit of the at least one individual conductor path in response to heat generated from conducting electrical current that exceeds a predetermined threshold.

8. The EDS of claim 7 wherein a first conductor path defines a first narrowed portion and a second conductor path defines a second narrowed portion, wherein the second narrowed portion is longitudinally staggered relative to the first narrowed portion.

9. The EDS of claim 7 wherein a first conductor path defines a first narrowed portion and a second conductor path defines a second narrowed portion, wherein the first narrowed portion defines a width greater than the second narrowed portion.

10. The EDS of claim 7 wherein the reduced width narrowed portion defines at least one of a rectangular notch shape, a trapezoidal notch shape, a semi-elliptical notch shape, and a sinusoidal notch shape.

11. The EDS of claim 7 wherein a first narrowed portion is configured to melt in response to heat generated from conducting electrical current greater than a first predetermined threshold and a second narrowed portion is configured to melt in response to heat generated from conducting electrical current greater than a second predetermined threshold.

12. The EDS of claim 7 wherein at least one of the individual conductor paths passes a signal from a low voltage sensor disposed at the traction battery.

13. The EDS of claim 7 wherein at least one of the individual conductor paths does not include a narrowed portion.

14. A vehicle comprising:
    a traction battery including a plurality of battery cells configured to power an electric machine over an electrical distribution system (EDS);
    a controller in electrical connection with the traction battery over the EDS; and
    at least one flexible electrical distribution components (FEDC) connection including an individual conductive trace extending from each of the plurality of battery cells to the controller, wherein each of the individual conductive traces defines a typical width and a reduced width narrowed portion sized to operate as a fuse and thereby break an electrical circuit between a corresponding one of the plurality of battery cells and the controller in response to heat generated from conducting an electrical current greater than a predetermined threshold, and wherein the reduced width narrowed portion defines a semi-elliptical notch shape or a sinusoidal notch shape.

15. The vehicle of claim 14 wherein the traction battery further includes at least one sensor to output a signal indicative of a battery cell temperature and an individual conductor path electrically connects the sensor to the controller.

16. The vehicle of claim 14 wherein a first conductive trace defines a first narrowed portion and a second conductive trace defines a second narrowed portion, wherein the second narrowed portion is longitudinally staggered relative to the first narrowed portion.

17. The vehicle of claim 14 wherein a first conductive trace defines a first narrowed portion and a second conductive trace defines a second narrowed portion, wherein the first narrowed portion defines a width greater than the second narrowed portion.

18. The vehicle of claim 14 wherein a first narrowed portion is configured to melt in response to heat generated from conducting electrical current greater than a first predetermined threshold and a second narrowed portion is configured to melt in response to heat generated from conducting electrical current greater than a second predetermined threshold.

* * * * *